UNITED STATES PATENT OFFICE.

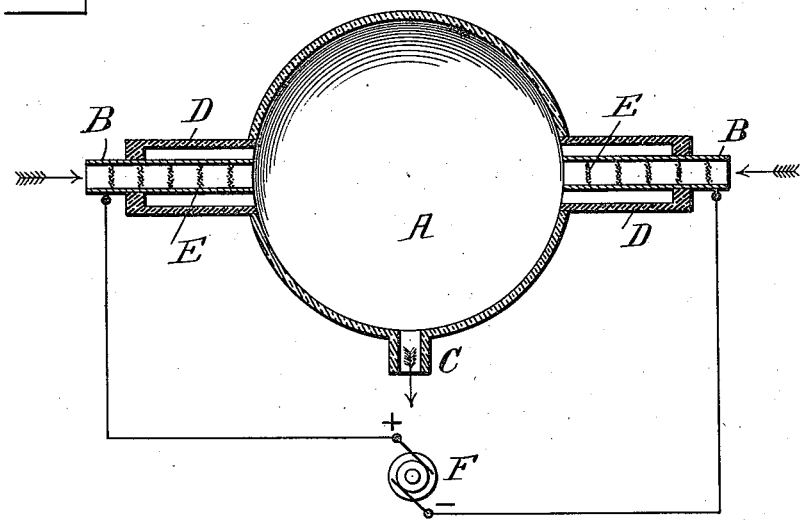
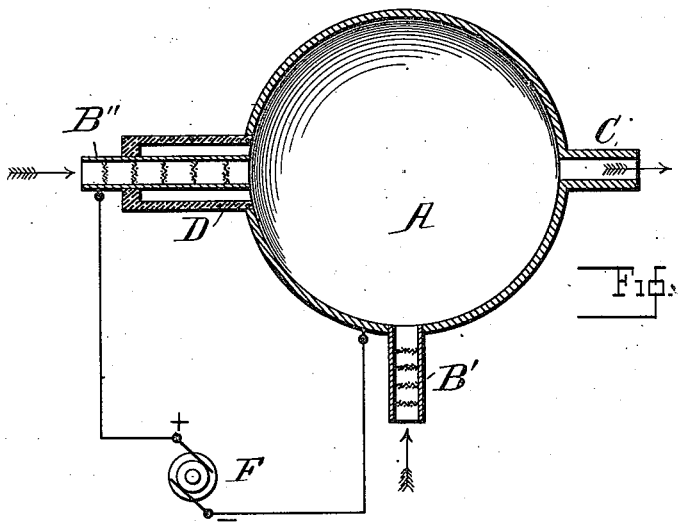

DIMMITT ROSS LOVEJOY, OF NIAGARA FALLS, NEW YORK, ASSIGNOR, BY MESNE ASSIGNMENTS, TO ATMOSPHERIC PRODUCTS COMPANY, OF NIAGARA FALLS, NEW YORK, A CORPORATION OF NEW YORK.

METHOD OF EFFECTING CHEMICAL ACTION IN GASES.

No. 829,872. Specification of Letters Patent. Patented Aug. 28, 1906.

Application filed March 22, 1901. Serial No. 52,361.

*To all whom it may concern:*

Be it known that I, DIMMITT ROSS LOVEJOY, a citizen of the United States, residing at Niagara Falls, in the county of Niagara and State of New York, have invented certain new and useful Improvements in Methods of Effecting Chemical Action in Gases, of which the following is a specification.

This invention relates to a method of effecting chemical action in gases, and particularly to a method of effecting the combination of two gases by causing their molecules to approach within chemical acting distance of each other.

It is well known that certain substances—such as platinum sponge, platinized asbestos, &c.—are capable of causing combination of gases, which otherwise would not unite, by bringing their molecules within acting distance of each other. The difficulties of this method are, first, the cost of platinum sponge or platinized asbestos, and, second, the diminution of the action after a time, due to the clogging up of the pores of the sponge or asbestos. In this invention the use of any solid or liquid material for effecting the required juxtaposition of the gaseous molecules is dispensed with and the molecules are caused to approach each other by means of electrostatic attraction. To this end the two gases to be combined are led into a chamber through metallic or electrically conducting inlets, and during their passage through these inlets the molecules of the gas are charged electrostatically by contact with the walls of the passage to a very high electrical potential, one gas positively and the other gas negatively. On entering the chamber the positively-charged molecules of the one gas are attracted to the negatively-charged molecules of the other gas, and are thus brought within the range of chemical attraction and a chemical combination thus effected. By this method gases may be caused to unite even when energy is absorbed by their union, as it is only necessary to charge the two sets of molecules to a sufficiently-high potential with respect to each other to store in them sufficient energy to effect the combination after bringing them into chemical contact.

I have used in operating on a mixture of nitrogen and oxygen a potential sufficient to produce a spark of about one inch through air from a static machine and obtained nitrous fumes; but a potential greater than this will produce greater results. For the formation of ozone both gases should be oxygen.

In charging the gases separately in this manner there will also occur a dissociating effect in the molecules of each gas. This will be favorable to the process as described, as the partly-dissociated gas will combine more readily. This dissociating effect may also be of use in the production of allotropic forms of elementary gases—for example, ozone—or in the decomposition of compound gases into their elements.

Referring to the accompanying drawings, which show in section two forms of apparatus for carrying out my invention, in Figure 1 A represents the combining-chamber, preferably of non-conducting material. B B are the inlet-pipes of conducting material and provided with permeable conductors or diaphragms of metallic or conducting gauze E E, so as to insure the thorough contact of the gaseous molecules with the electrified surfaces. D D are insulating-sheaths to prevent loss of electricity by leakage, and C is the outlet for the mixed gases. F is a source of high electrical potential.

Fig. 2 shows a modification of this apparatus in which the combining-chamber itself is made of conducting material and serves as one of the electrically-charged surfaces. One gas enters at B' and is charged by contact with the inlet-tube of conducting material and gauze diaphragms and also by contact with the walls of the chamber. The other gas enters at B'' through the conducting-tube and gauze diaphragms supported on an insulating-sheath, as in Fig. 1, the combined gases passing out at C, as before. F is again a source of great difference of electrical potential. Variations of details of the conducting-chambers are non-essential and obvious.

In case only one gas is to be acted upon it may be supplied at both sides of the apparatus, the two portions being then allowed to mix or kept separate until discharged by other means. While I have given a theory of the operation of the method, it will be understood that it is only explanatory, and it is immaterial to the process by what reasoning it is explained, provided that the effect of causing reaction of the gases on one another by the force or effect of the electrostatic energy stored in the gases is obtained.

The accompanying drawings are designed to assist in elucidating the process or method of effecting chemical action in gases, which is the subject of the present application. Complete apparatus for carrying the process into effect will be fully described and claimed in a separate application, Serial No. 116,150, filed July 19, 1902.

I claim—

1. The method of causing gases to unite chemically which consists in imparting to the gases to be united electrostatic charges of different polarities, then bringing said charged gases within the range of their mutual electrostatic attraction.

2. The method of causing two gases to unite chemically which consists in imparting to the molecules of each gas an electrostatic charge, the said charges being such as to cause the charged gases to have a mutual molecular attraction one for the other and bringing said gases within the range of said molecular attraction.

3. The method of causing gases to unite chemically which consists in imparting to the molecules of the respective gases an electrostatic charge, said charges being of different polarity to cause the mutual electrostatic attraction between molecules of the respective gases and of a potential sufficient to effect chemical combination and then mixing the charged gases.

4. The method of causing gases to react chemically on one another which consists in charging one gas electrostatically and then bringing it in contact with the other gas.

5. The method of causing gases to unite chemically which consists in charging the gases separately with charges of different polarity, and then mixing the charged gases, the difference of polarity of the charged gases being such that when the gases are mixed the electrostatic attraction of the molecules of one gas for the molecules of the other gas will cause combination of the gases.

6. The method of causing gases to react upon one another which consists in storing electrostatic energy in one of the gases and then bringing said gases into contact.

7. The method of causing a gas to react chemically upon another substance which consists in charging said gas so as to store electrostatic energy therein and then bringing it in contact with said substance.

8. The method of causing gases to react chemically on one another which consists in charging both of such gases electrostatically, and then mixing the gases.

DIMMITT ROSS LOVEJOY

Witnesses:
Wm. C. Wallace,
L. S. Avery.